US010001665B2

(12) United States Patent
Kwon et al.

(10) Patent No.: US 10,001,665 B2
(45) Date of Patent: Jun. 19, 2018

(54) DISPLAY DEVICE FOR PREVENTING MOISTURE INFILTRATION

(71) Applicant: LG Display Co., Ltd., Seoul (KR)

(72) Inventors: DaeSung Kwon, Gyeonggi-do (KR); DoHeon Kim, Gyeonggi-do (KR); Donghoon Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days. days.

(21) Appl. No.: 15/165,185

(22) Filed: May 26, 2016

(65) Prior Publication Data

US 2016/0349567 A1   Dec. 1, 2016

(30) Foreign Application Priority Data

May 27, 2015 (KR) .................. 10-2015-0074189

(51) Int. Cl.
*G06F 1/16* (2006.01)
*H05K 5/00* (2006.01)
*H05K 7/00* (2006.01)
*G02F 1/1333* (2006.01)

(52) U.S. Cl.
CPC .......... *G02F 1/133308* (2013.01); *G02F 2001/133311* (2013.01); *G02F 2001/133317* (2013.01); *G02F 2202/28* (2013.01)

(58) Field of Classification Search
CPC .......... G02F 1/133308; G02F 2202/28; G02F 2001/133317; G02F 2001/133322; G02F 2001/133331; G02F 2001/133311; G02F 2001/13332; G02F 1/133608; G06F 1/1637; G06F 1/1601
USPC .................................... 361/679.21
See application file for complete search history.

(56) References Cited

U.S. PATENT DOCUMENTS

| 5,406,399 | A | * | 4/1995 | Koike | G02F 1/133308 349/58 |
| 2010/0302473 | A1 | * | 12/2010 | Poveda | G02F 1/133308 349/58 |
| 2013/0027857 | A1 | * | 1/2013 | Jeong | G02F 1/133308 361/679.01 |
| 2014/0160694 | A1 | * | 6/2014 | Yoon | G02F 1/1303 361/749 |
| 2016/0154271 | A1 | * | 6/2016 | Kim | G02F 1/133308 349/58 |

* cited by examiner

*Primary Examiner* — James Wu
(74) *Attorney, Agent, or Firm* — Morgan, Lewis & Bockius LLP

(57) ABSTRACT

A display device includes a display panel; a middle cabinet including a first support surrounding sides of the display panel and a second support extending inward from inner surfaces of the first support with the display panel seated on the second support; and a sealing-bonding member disposed on the second support abutting the first support to couple the display panel with the middle cabinet and to seal the display panel and the middle cabinet together.

12 Claims, 8 Drawing Sheets

DISPLAY DEVICE FOR PREVENTING MOISTURE INFILTRATION

This application claims priority from Korean Patent Application Number 10-2015-0074189 filed on May 27, 2015, which is hereby incorporated by reference for all purposes as if fully set forth herein.

BACKGROUND

Field of the Disclosure

The present disclosure relates to a display device, and more particularly, to a narrow bezel-type display device, the areas of the outer margins of which are reduced, or a borderless display device, the outer margin portions of which are removed.

Description of Related Art

In general, liquid crystal display (LCD) devices, plasma display devices, field emission display (FED) devices, light-emitting display devices, and the like have been actively researched as flat panel display devices. Among these display devices, LCD devices and light-emitting display devices have come to prominence due to their merits, such as the ability to mass produce elements thereof, ease in the construction of driving units, and the realization of high image quality.

Figure 1:
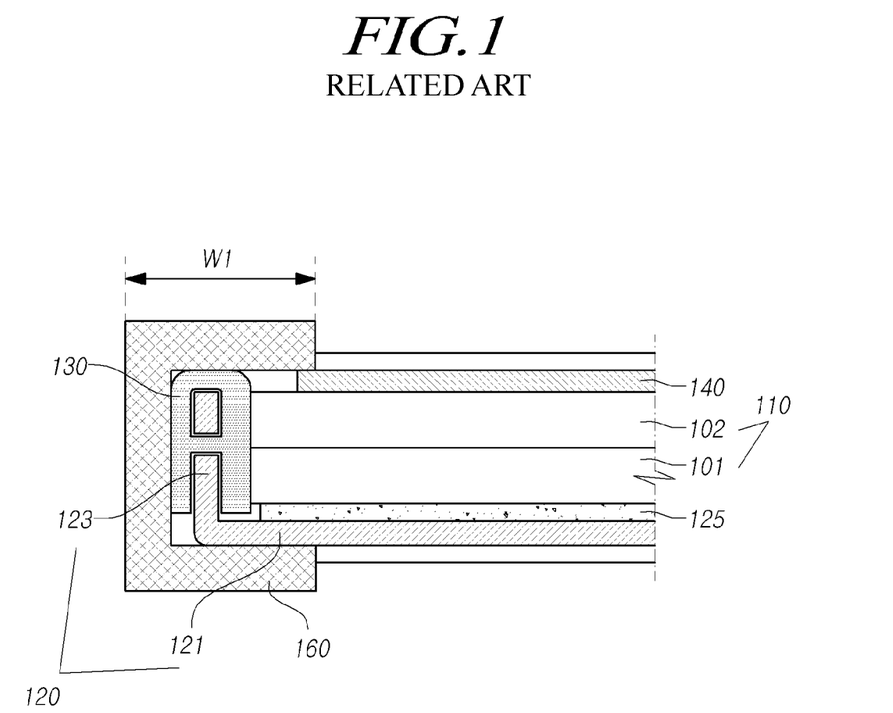
FIG. 1 is a cross-sectional view illustrating a display device of the related art.

FIG. 1 is a cross-sectional view illustrating a display device of the related art. The display device includes a first substrate 101 and a second substrate 102 disposed opposite to the first substrate 101. The first and second substrates 101 and 102 are spaced apart from each other, such that the margins thereof are sealed and joined using a sealant, thereby forming an OLED panel 110.

A reflector 140 is attached to the top surface of the OLED panel 110. Because the OLED panel 110 has a drawback in that the contrast thereof is significantly reduced depending on the intensity of external light, the reflector 140 is provided to prevent the contrast from being reduced by external light.

The bottom surface of the OLED panel 110 is coupled to a cover bottom 120 including a horizontal portion 121 and a side portion 123 via a bonding member 125. A buffer member 130 is coupled to the side portion 123 of the cover bottom 120. A case 160 is coupled to the outer surface of the resultant structure while surrounding a portion of the front surface of the OLED panel 110.

However, in such a display device of the related art, the case acting as a bezel, exposed to the front, has a relatively wide area, failing to satisfy desired aesthetics of users and to immerse users in viewing the screen.

In particular, requests for slimmed or aesthetically-improved designs in which the thickness of a display device is reduced or slimmed or the area of the bezel exposed to the front is reduced are gradually increasing because such designs can stimulate product sales by increased appeal to consumers. Therefore, in small and large-area display devices, demand for narrow bezel-type display devices in which the areas of the outer margins are reduced or borderless display devices in which the outer margins are removed entirely are increasing in order to satisfy user demands in terms of design.

SUMMARY

Accordingly, the present invention is directed to a display device that substantially obviates one or more of the problems due to limitations and disadvantages of the related art.

An object of the present disclosure is to provide a small or large-area display device where the areas of the outer margins are reduced to obtain a slim and lightweight design.

Another object of the present disclosure is to provide a small or large-area display device that has a significantly-reduced width of a front bezel while preventing external moisture from infiltrating, thereby protecting a plurality of circuit films and a printed circuit board (PCB) disposed on a circuit-mounting part connected to a display panel and simplifying a fabrication process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises a display panel; a middle cabinet including a first support surrounding sides of the display panel and a second support extending inward from inner surfaces of the first support with the display panel seated on the second support; and a sealing-bonding member disposed on the second support abutting the first support to couple the display panel with the middle cabinet and to seal the display panel and the middle cabinet together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, reference will be made to embodiments of the present disclosure in detail, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

Figure 2:
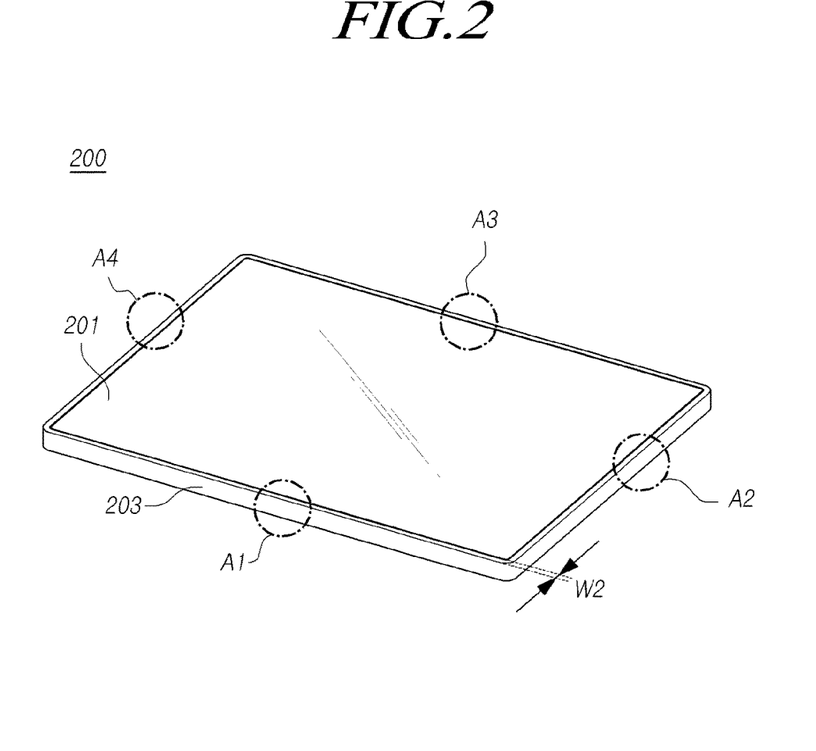
FIG. 2 is a perspective view illustrating a display device according to an exemplary embodiment of the present disclosure.

FIG. 2 is a perspective view illustrating a display device according to an exemplary embodiment of the present disclosure. FIGS. 3-7 are cross-sectional views illustrating the display device according to the exemplary embodiment. FIG. 8 illustrates a process of attaching a display panel to a middle cabinet in the display device according to the exemplary embodiment.

As illustrated in FIGS. 2-8, a display device 200 may include a display panel 201, a middle cabinet 203, and a sealing-bonding member 215. In the middle cabinet 203, a first support 203a surrounds side surfaces of the display panel 201, and a second support 203b extends inward from the inner surfaces of the first support 203a, such that the display panel 201 is seated on the second support. The sealing-bonding member 215 is disposed on the joint between the first support 203a and the second support 203b to couple the display panel 201 and the middle cabinet in a hermetically sealing manner.

First, comparing FIG. 2 with FIG. 1, the display device 200 according to the exemplary embodiment is configured as a four-sided borderless or bezel-less display device such that the widths of the outer margins thereof, e.g., the bezel widths W2 thereof according to the present disclosure, are significantly reduced from the bezel widths W1 of the related art. With this configuration, the display device 200 can be provided as a four-sided substantially borderless display or a substantially bezel-less display.

To reduce the bezel width, according to this exemplary embodiment, the related-art case acting as a bezel is omitted, and a middle cabinet 203 has the first support 203a surrounding the side surfaces of the display panel 201, and the second support 203b extending inward from the inner surfaces of the first support 203a with the display panel is seated thereon.

The display panel 201 as described above is applicable regardless of the use of a liquid crystal display (LCD) panel or a light-emitting display panel. Specifically, when the display panel is implemented as an LCD panel, the display panel may further include a backlight unit irradiating the LCD panel with light, a bottom reflector attached to a bottom substrate, and a top reflector attached to the front surface of the top substrate. The specific configurations of the bottom substrate and the top substrate may include a variety of shapes well known in the art depending on the driving mode of the LCD panel, for example, a twisted nematic (TN) mode, a vertical alignment (VA) mode, an in-plane switching (IPS) mode, and a fringe field switching (FFS) mode.

When the display panel is implemented as a light-emitting display panel, the light-emitting display panel may include a bottom substrate including a plurality of light-emitting cells in a plurality of areas defined by gate lines, data lines, and power (VDD) lines and a top substrate disposed opposite to and coupled to the bottom substrate.

In addition, each of the plurality of light-emitting cells disposed on the bottom substrate may include at least one switching transistor connected to the corresponding gate line and the corresponding data line, at least one driving transistor connected to the switching transistor and the corresponding power line, and a light-emitting element, such as an organic light-emitting diode (OLED), generating light in response to current controlled through switching of the driving transistor. The top substrate includes a drying agent, or the like, to protect the light-emitting element from moisture or oxygen in the air.

Here, the top substrate may further include a light-emitting element connected to a driving transistor, and the light-emitting element on the bottom substrate may be omitted.

According to the illustrated embodiment, the display panel 201 is seated on top of the second support 203b of the middle cabinet 203. In the drawings, a light-emitting display panel is illustrated as an example. Since the light-emitting display panel has a self-emitting structure, a backlight unit is not provided. The following description will be given with respect to the light-emitting display panel, as an example.

An organic compound in a pixel array of the light-emitting display panel may degrade when exposed to moisture or oxygen. To prevent the problem of a degraded pixel, an encapsulation member 201b may be bonded to the rear surface of the display panel 201 to hermetically seal the pixel array. The encapsulation member 201b may be a metal substrate or a glass substrate, and a polarizer film 201a may be bonded to the front surface of the display panel 201. To prevent light from the pixel array from leaking through the side surface, a side seal member 213 may be disposed on the side surfaces of the display panel 201. Here, the side seal member 213 may be formed of a polymer material to which black pigment is added. The side seal member 213 absorbs light emitted from the pixel array, such that light directed toward the side surface of the display panel 201 is not seen.

In addition, on the rear surface of a margin portion (e.g., a region A) of the oblong display panel 201, a plurality of flexible circuit films 201d are electrically connected to the display panel 201, with integrated circuits (ICs, 201e) being mounted thereon, and a printed circuit board (PCB, not shown) is arranged to be parallel to the display panel 201.

The plurality of flexible circuit films 201d are attached to a pad (not shown) and the PCB through tape automated bonding (TAB). Each of the flexible circuit films 201d may be formed using a tape carrier package (TCP) process, a chip on flexible board (COF) process, or a chip on film (COF) process.

With this configuration, the display panel 201 is electrically connected to the PCB (not shown) via the plurality of flexible circuit films 201d, and the PCB is electrically connected to the plurality of flexible circuit films 201d to provide a variety of signals to the display panel 201 to display images.

The middle cabinet 203 includes the first support 203a and the second support 203b connected perpendicularly to each other. Since the first support 203a, functioning as a case, surrounds side surfaces of the display panel 201 while being exposed to the front, the regions from the outer surfaces of the first support 203a to the side surfaces of the display panel 201, i.e., the bezels, are significantly reduced. The display panel 201 seated on the front surface of the second support 203b, and a back cover 205 is coupled to the rear surface of the second support 203b.

Although the bezel widths are significantly reduced when the bezels are defined by the top surfaces of the first support 203a and the gaps between the first support 203a and the panel 201, external moisture may infiltrate through the gaps between the first support 203a and the side surfaces of the panel 201. To protect the flexible circuit films 201d and the PCB from potential moisture infiltration, the sealing-bonding member 215 couples the display panel 201 and the middle cabinet 203 to each other while hermetically sealing the gaps therebetween.

Figure 3:
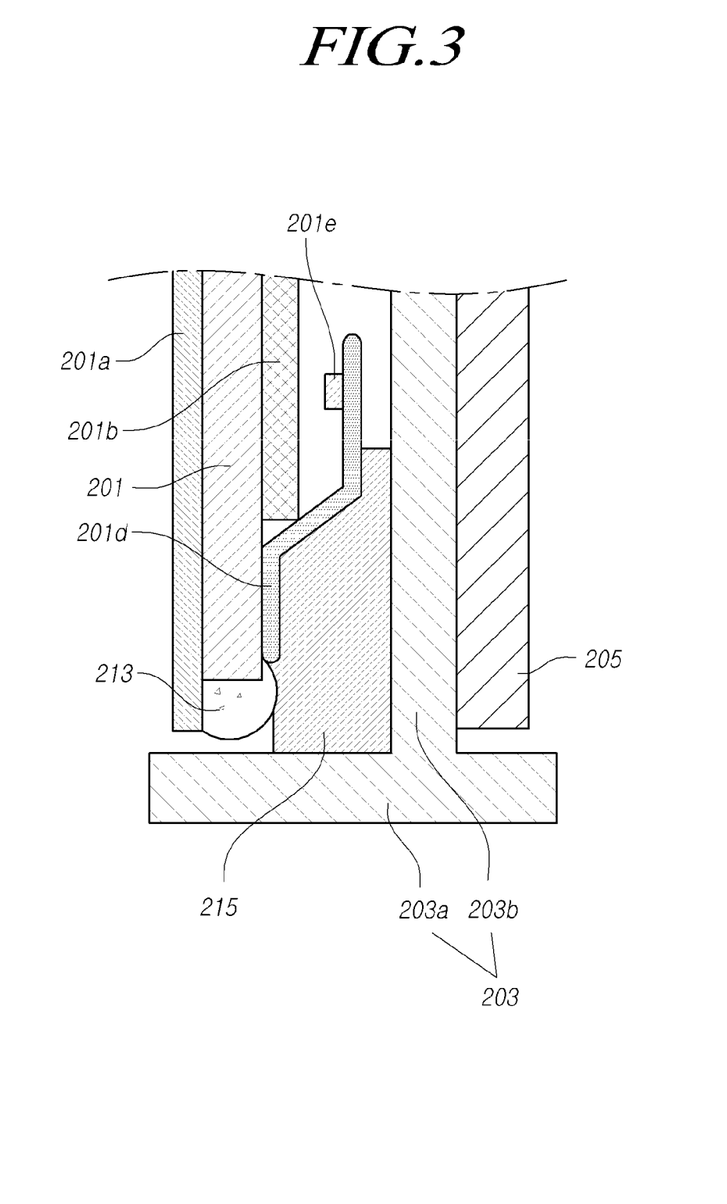
FIGS. 3-7 are cross-sectional views illustrating the display device according to the exemplary embodiment.

As illustrated in FIG. 3, the flexible circuit films 201d are disposed on one outer margin (e.g. A1) of four outer margins (A1, A2, A3, and A4 in FIG. 2) of the oblong display panel 201. The sealing-bonding member 215 is disposed on the joint between the first support 203a and the second support 203b of the middle cabinet 203 to be tightly bonded to the side surfaces and the rear surfaces of the flexible circuit films 201d disposed on the rear surface of the outer margin A1 of the display panel 201 in a hermetically sealing manner, thereby preventing moisture from infiltrating between the first support 203a and the outer margin of the display panel 201.

In addition, when the polarizer film 201a is disposed on the front surface of the display panel 201 and the side seal member 213 is disposed on the margins of the polarizer film 201a and the side surfaces of the display panel 201, the sealing-bonding member 215 is tightly bonded to the flexible circuit films 201d and the side seal member 213, as illustrated in FIG. 3, thereby preventing moisture from infiltrating between the first support 203a and the outer margins of the display panel 201. Here, the side seal member 213 is formed of a polymer material to which black pigment is added as described above, such that light directed toward the side surface of the display panel 201 is not seen.

Figure 4:
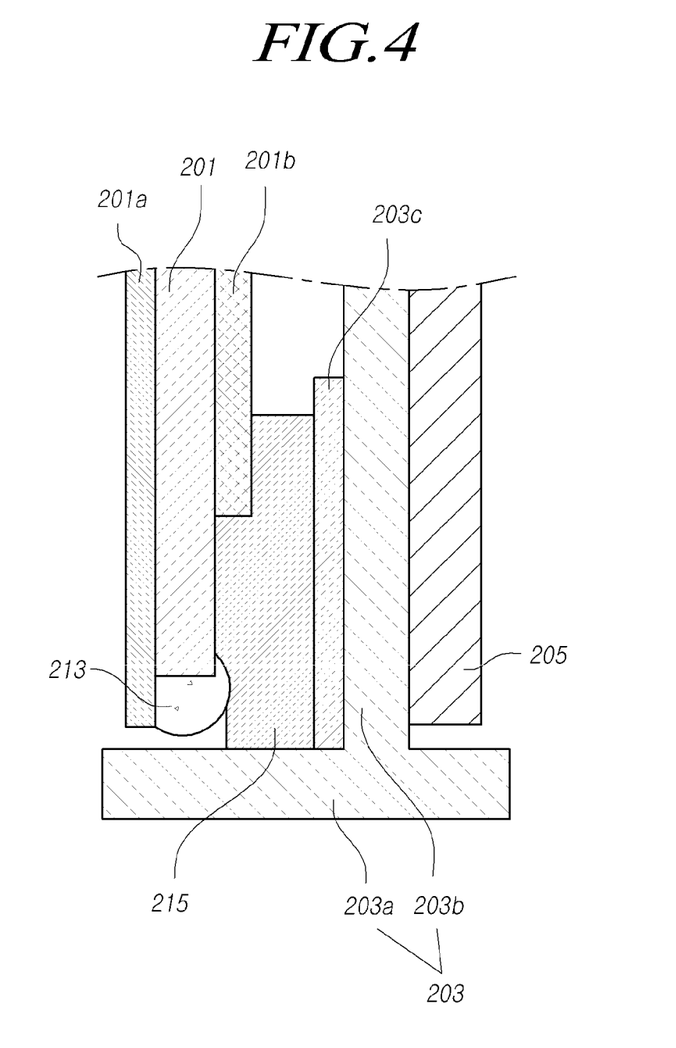

In addition, as illustrated in FIG. 4, on the outer margins (e.g., A2, A3, and A4) of the display panel 201 on which the flexible circuit films 201d are not disposed, the sealing-bonding member 215 is tightly bonded to the display panel 201 and the encapsulation member 201b disposed on the rear surface of the display panel 201, thereby preventing moisture from infiltrating between the first support 203a and the outer margins of the display panel 201.

Furthermore, as described above, the polarizer film 201a is disposed on the front surface of the display panel 201 and the side seal member 213 may be disposed on the outer margins of the polarizer film 201a and the display panel 201. In this case, as illustrated in FIG. 4, the sealing-bonding member 215 is tightly bonded to the encapsulation member 201b and the side seal member 213 in a hermetically sealing manner as described above, thereby preventing moisture from infiltrating between the first support 203a and the outer margins of the display panel 201.

Figure 5:
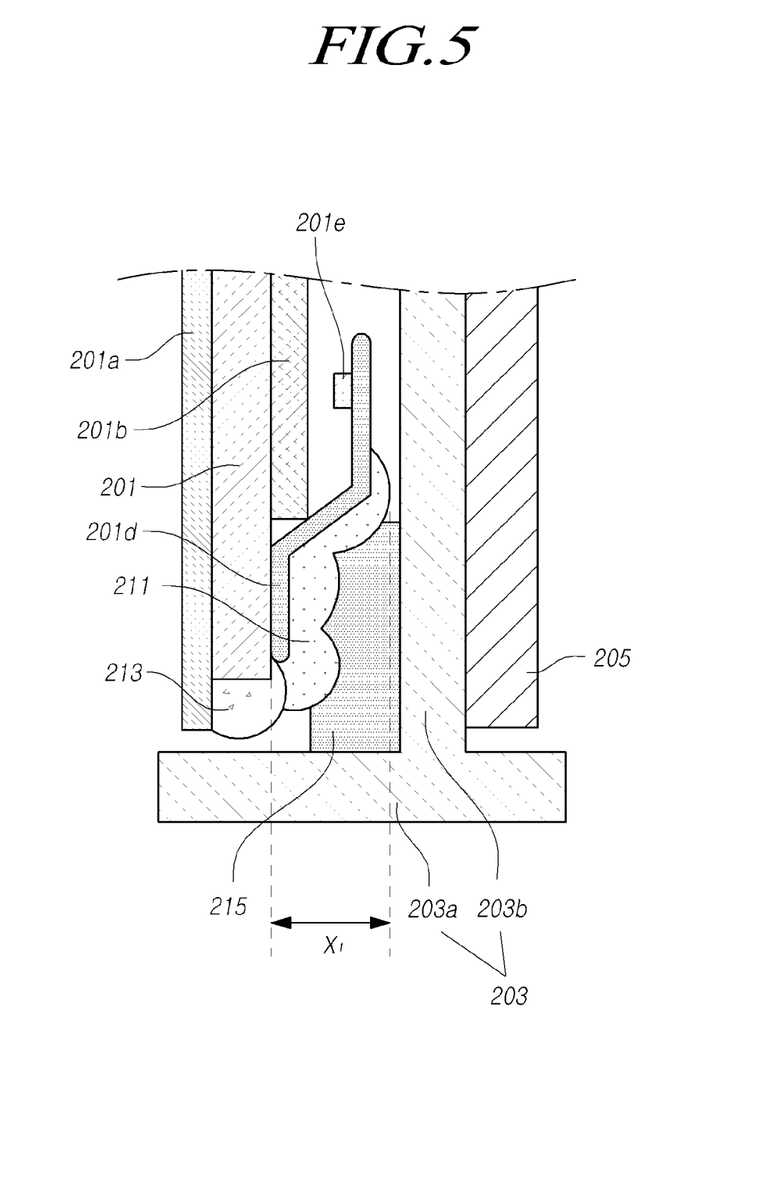

In addition, as illustrated in FIG. 5, a drying-insulating member 211 is disposed on the side surfaces and rear surfaces of the flexible circuit films 201d to protect the ICs 201e of the flexible circuit films 201d. In this case, the sealing-bonding member 215 is tightly bonded to the drying-insulating member 211 to prevent moisture from infiltrating between the first support 203a and the outer margins of the display panel 201.

Figure 6:
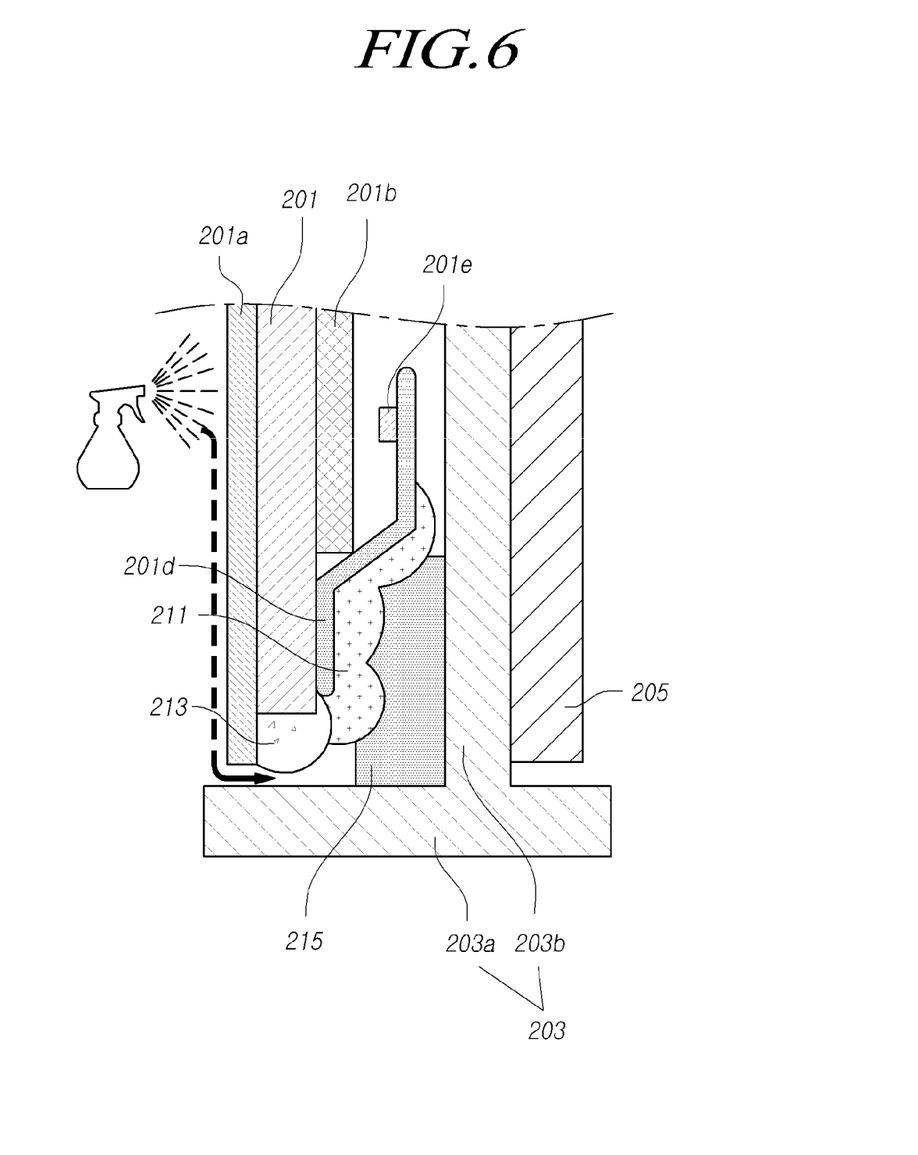

Therefore, as illustrated in FIG. 6, when a user intentionally sprays liquid, such as a cleaning agent, onto the display panel 201, moisture stays on the first support 203a of the middle cabinet 203 without infiltrating in the direction of the flexible circuit films 201d. Thus, the ICs 201e and the circuit part, which are vulnerable to moisture, can be protected.

In addition, as illustrated in FIG. 4, stepped portions 203c are disposed on the portions of the second support 203b to which the rear surfaces of the outer margins (e.g., A2, A3, and A4) of the display panel 201 on which the flexible circuit films 201d are not disposed. The stepped portions 203c protrude in the direction of the display panel 201.

In this case, the encapsulation member 201b is disposed on the rear surface of the display panel 201, and the sealing-bonding member 215 couples the encapsulation member 201b and the display panel 201 to the middle cabinet 203 while preventing moisture infiltration.

The stepped portions 203c may be formed of the same material as the middle cabinet 203, forming integral portions of the latter, or may be formed as separate members coupled to the middle cabinet 203. The widths of the stepped portions 203c extend from the inner surfaces of the first support 203a to the portions of the first support 203a overlapping the encapsulation member 201b. In some cases, the stepped portions 203c may be replaced with pads having predetermined thicknesses.

Figure 7:
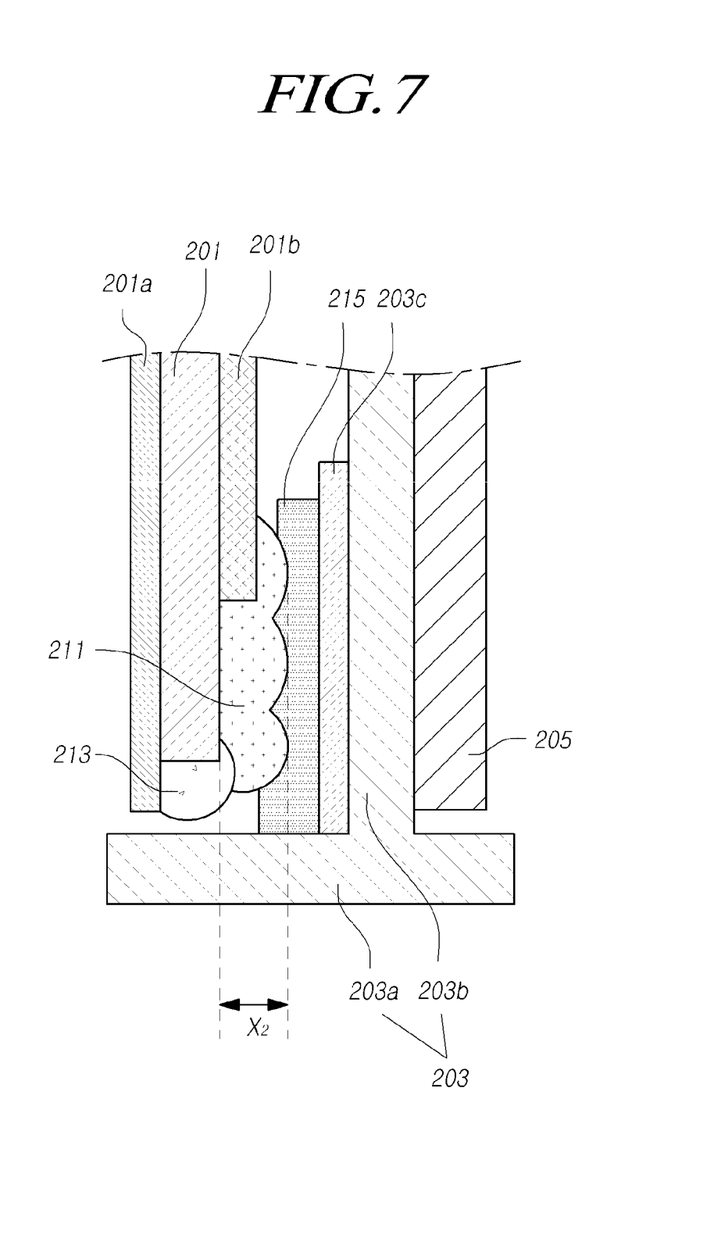
Figure 8:
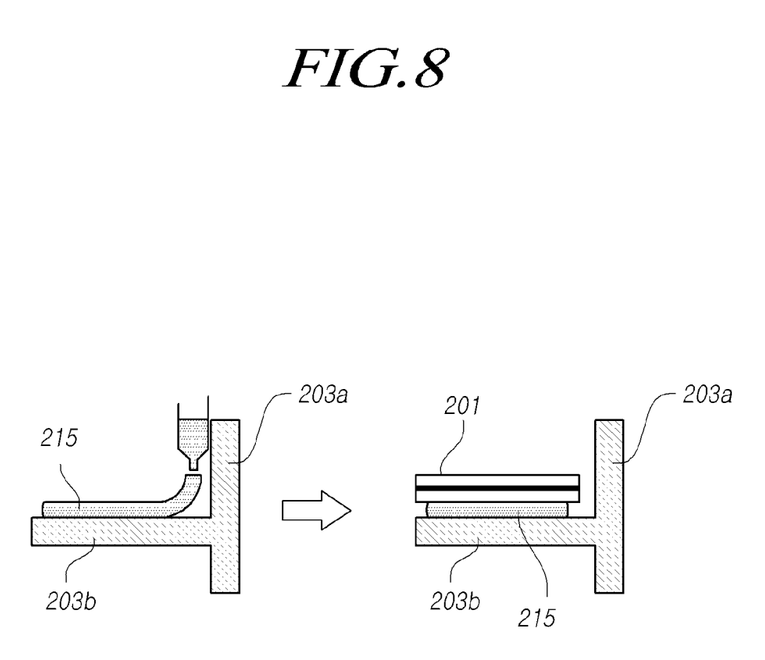
FIG. 8 illustrates a process of attaching a display panel to a middle cabinet in the display device according to the exemplary embodiment.

Comparing FIG. 5 illustrating the outer margin having the flexible circuit films 201d to FIG. 7 illustrating one of the other outer margins without the flexible circuit films 201d, the flexible circuit films 201d protruding from the rear surface of the display panel 201 cause the thickness X1 from the rear surface of the display panel 201 to the drying-insulating member 211 in FIG. 5 to be greater than the thickness X2 from the rear surface of the display panel 201 to the drying-insulating member 211. When the display panel 201 is seated on the middle cabinet 203, the heights of the four outer margins of the display panel 201 may be uneven.

Thus, on the joint between the first support 203a and the stepped portions 203c disposed on the second support 203b to which the rear surfaces of the other outer margins without the flexible circuit films 201d are coupled, the sealing-bonding member 215 couples the rear surface of the display panel 201 to the middle cabinet 203 in a hermetically sealing manner, thereby preventing moisture from infiltrating while removing any difference in the height among the four outer margins of the display panel 201.

In addition, as illustrated in FIG. 7, the encapsulation member 201b is disposed on the rear surface of the display panel 201, and the drying-insulating member 211 is disposed on the side surfaces and the rear surface of the encapsulation member 201b. In this case, the sealing-bonding member 215 is tightly bonded to the drying-insulating member 211 in a hermetically sealing manner, thereby preventing the heights of the four outer margins of the display panel 201 from being uneven while preventing moisture infiltration.

The sealing-bonding member 215 may be formed of a high viscosity curable resin, examples of which include acryl resin, epoxy resin, non-foaming urethane resin, and the like. The curable resin is naturally curable, is ultraviolet (UV) curable, or is thermally curable. As illustrated in FIG. 8, the sealing-bonding member 215 is applied to the second support 203b of the middle cabinet 203. After the sealing-bonding member 215 is semi-cured, the display panel 201 is seated on top of the sealing-bonding member 215. When the sealing-bonding member 215 is completely cured, the sealing-bonding member 215 bonds the display panel 201 and the middle cabinet 203 to each other while preventing moisture infiltration.

According to the example embodiment, as illustrated in FIGS. 3 and 4, the display panel 201 may be coupled to the middle cabinet 203 without the drying-insulating member 211 disposed on the flexible circuit films 201d. In this case, the sealing-bonding member 215 can function as the drying-insulating member 211, thereby simplifying the assembly process.

Although not illustrated in the drawings, the other outer margins of the display panel 201 on which the flexible circuit films 201*d* are not disposed may be coupled to the middle cabinet 203 via an adhesive pad, a double-sided tape, or the like, instead of the sealing-bonding member 215, since moisture infiltration in these regions does not have an effect on the flexible circuit films 201*d*. In this case, the adhesive tape or the double-sided tape may be implemented as a thermally-conductive adhesive tape to facilitate the dissipation of heat from the display panel 201 to the middle cabinet 203.

Although the middle cabinet 203 may be formed of a synthetic resin, such as plastic, or a metal considering machinability and material cost, the middle cabinet 203 may be formed of Al, an Al alloy, stainless steel, or galvanized steel considering strength and heat dissipation ability.

In accordance with embodiments of the present disclosure, a display device may have a middle cabinet that is coupled to a display panel through hermetic sealing to surround the side surfaces of the outer margins of the display panel. Thus, the bezel widths of the display device can be reduced while preventing external moisture from infiltrating.

As such, it is possible to reduce the areas of the outer margins of small and large-area display devices, thereby obtaining slim and lightweight designs.

In addition, according to the present disclosure, small and large-area display devices can have a significantly-reduced width of a front bezel while preventing external moisture from infiltrating, thereby protecting the plurality of circuit films and the PCB disposed on a circuit-mounting part connected to the display panel and simplifying a fabrication process.

It will be apparent to those skilled in the art that various modifications and variations can be made in the display device of the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display panel;
    a middle cabinet comprising a first support surrounding side surfaces of the display panel and a second support extending inward from inner surfaces of the first support;
    a sealing-bonding member disposed on a joint between the first support and the second support to couple the display panel to the middle cabinet in a sealing manner;
    a side seal member disposed on the side surfaces of the display panel; and
    a polarizer film disposed on a front surface of the display panel, wherein the side seal member contacts a lower surface of the polarizer film along a periphery thereof and the side surfaces of the display panel,
    wherein the periphery of the polarizer film extends beyond a periphery of the display panel and a periphery of the side seal member,
    wherein the sealing-bonding member is provided in a space between the second support and the rear sides of the side seal member and the display panel such that the display panel is seated on the second support with the sealing-bonding member therebetween,
    wherein the side seal member is spaced apart from the first support of the middle cabinet, and
    wherein the side seal member and the sealing-bonding member are formed of different materials, the sealing-bonding member comprising a curable resin and the side seal member comprising a polymer having a black pigment therein.

2. The display device according to claim 1, further comprising a flexible circuit film disposed on a rear surface of the display panel, wherein the sealing-bonding member is bonded to a rear side of the flexible circuit film and the middle cabinet to form a seal.

3. The display device according to claim 2, further comprising an encapsulation member disposed on rear surfaces of the display panel where the flexible circuit film is not disposed, wherein the sealing-bonding member is bonded to the encapsulation member and the display panel to seal the encapsulation member and the display panel together.

4. The display device according to claim 3,
    wherein the sealing-bonding member is bonded to the encapsulation member and the side seal member to be sealed.

5. The display device according to claim 4, wherein the side seal member and the polarizer film are spaced apart from the first support of the middle cabinet.

6. The display device according to claim 4, wherein the side seal member contacts the lower surface of the polarizer film along an entirety of the periphery thereof.

7. The display device according to claim 6, wherein the entirety of the periphery of the polarizer film extends beyond a periphery of the display panel.

8. The display device according to claim 2, further comprising a drying-insulating member disposed on a side surface and a rear surface of the flexible circuit film, wherein the sealing-bonding member is bonded to the drying-insulating member to seal around the drying-insulating member.

9. The display device according to claim 2, further comprising stepped portions disposed on the second support to which the rear surfaces of the display panel without the flexible circuit film are coupled, the stepped portions protruding in a direction perpendicular to a front surface of the display panel, wherein the sealing-bonding member seals between the stepped portions and the first support and couples the rear surface of the display panel to the middle cabinet.

10. The display device according to claim 9, further comprising an encapsulation member disposed on the rear surface of the display panel, wherein the sealing-bonding member is bonded to the encapsulation member and the display panel to be sealed.

11. The display device according to claim 10, further comprising a drying-insulating member disposed on a side surface and a rear surface of the encapsulation member, wherein the sealing-bonding member is bonded to the drying-insulating member to seal around the drying-insulating member.

12. The display device according to claim 9, wherein widths of the stepped portions extend inward on the second support from the inner surfaces of the first support.

* * * * *